Figure 1:
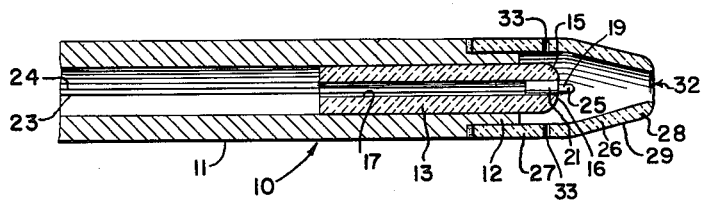

July 9, 1957  E. M. WINKLER  2,798,893
STAGNATION TEMPERATURE PROBE
Filed Nov. 4, 1954

INVENTOR
EVA M. WINKLER

BY
ATTORNEYS

United States Patent Office 2,798,893
Patented July 9, 1957

2,798,893
STAGNATION TEMPERATURE PROBE

Eva M. Winkler, Silver Spring, Md., assignor to the United States of America as represented by the Secretary of the Navy Application November 4, 1954, Serial No. 466,958

6 Claims. (Cl. 136—4)

(Granted under Title 35, U. S. Code (1952), sec. 266)

The invention described herein may be manufactured and used by or for the Government of the United States of America for governmental purposes without the payment of any royalties thereon or therefor.

The present invention relates to a shielded thermocouple and more particularly to a stagnation temperature probe of which the physical dimensions are preferably small such that the probe is readily insertible into a comparatively small space.

Moreover, the invention contemplates the provision of a new and improved probe especially suited for use at elevated temperatures for accurately measuring the temperature of the air moving through a wind tunnel at supersonic speeds, while avoiding the usual effect of radiant heat on such measurements.

Temperature probes heretofore used at supersonic speeds have not proven entirely satisfactory for the reason that metal shield employed therewith causes a large amount of radiation and conduction losses, the probes having two or more vented shields arranged about the sensing thermocouples caused the overall dimensions of the temperature measuring device to be too large for practical use and the unshielded probes were useable only at low velocity and low temperature.

In accordance with the present invention a new and improved temperature probe has been devised which overcomes the aforesaid disadvantages encountered in prior devices by providing a single shielded probe resulting in substantially no heat radiation losses and which is small in size and readily insertible into a comparatively small space. Furthermore, since material and finish of the shields, length and diameter of the thermocouple wires, as well as vent area and size of the probe are parameters affecting the temperature recovery of the probe, it has been found by actual tests that a single-shielded probe constructed in accordance with the present invention may perform in a manner comparable to multiple-shielded probes now in use, by proper selection of such parameters, particularly by constructing the shield of non-metallic low heat conducting material in contradistinction to the metallic shields commonly used in prior art probes for measuring the condition of the air at elevated temperatures.

The probe of the present invention consists essentially of a shield composed of silica having the interior and exterior surfaces thereof coated with platinum or gold to reduce heat conduction losses through the shield and radiation losses from the shield surface. The shield is secured to a stainless steel elongated holder by a suitable thermally insulating cement, the shield being provided with a pair of diametrically disposed vent apertures thereby to provide a continuous replacement of air within the probe. The thermocouple may be of any suitable type, preferably the type known in the art as a 30 gauge iron-constantan wire type. The thermocouple is sealed within the silica supporting member by a suitable cement sealing compound such, for example, as copper cement or the like, the exposed surface of the support being semi-spherical and coated with platinum. The size of the aforesaid vent apertures and length of the thermocouple projection may be varied, a desirable performance having been obtained for a vent-area to entrance-area ratio of 1:5.

An object of the present invention is the provision of a small temperature probe which is substantially free from heat radiation losses and the conduction losses of which can be kept to a minimum.

Another object of the invention is the provision of a single-shielded and vented thermocouple probe for measuring air temperatures at supersonic speeds and elevated tempeeratures.

A still further object of the invention is the provision of a temperature probe which is simple in structure, economical to manufacture and which possesses all the desired characteristics of a high degree of accuracy in operation, ruggedness and durability in service.

Figure 2:
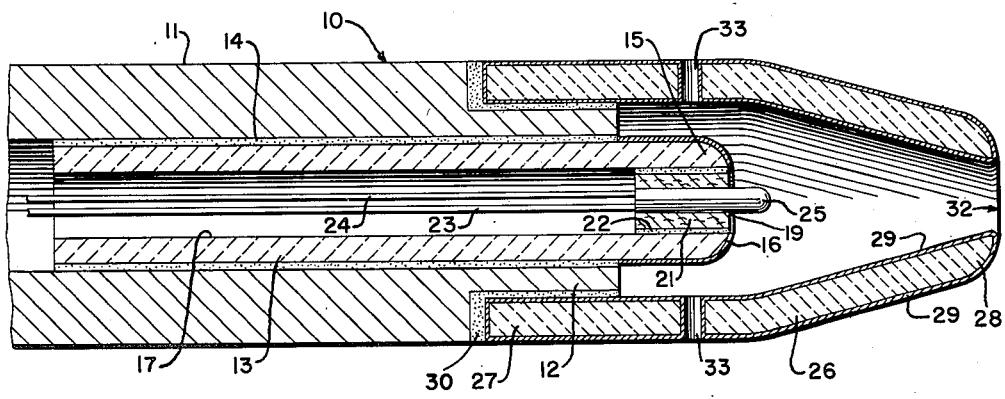

Other objects and many of the attendant advantages of this invention will be readily appreciated as the same becomes better understood by reference to the following detailed description when considered in connection with the accompanying drawings wherein:

Fig. 1 is a central longitudinal sectional view of a temperature probe constructed in accordance with the present invention; and Fig. 2 is an enlarged fragmentary sectional view of the working end of the probe.

The fundamental simplicity of the present invention may be best understood with reference to Fig. 1 wherein the numeral 10 generally indicates the probe comprising a tubular support or holder 11 composed preferably of stainless steel or the like and having formed on one end thereof a nipple 12 of less diameter than the tube 11.

A thermocouple support 13 composed of silica is disposed within the tubular holder 12 and sealed therein by a suitable cement sealing compound such, for example, as copper cement or the like as at 14. The support 13 is provided with a semi-spherical end portion 15, preferably coated with a suitable malleable and ductile metallic material 16 which is not readily fusible and which is resistant to most chemicals such, for example as platinum, gold or the like. The member 13 is further provided with a centrally disposed bore 17 extending therethrough having disposed therein a conventional iron-constantan type thermocouple 19, the thermocouple being provided with a Fiberglas insulating sleeve 21 disposed within the bore 17 and sealed to the silica member 13 as at 22 by a suitable cement sealing compound such, for example as copper cement or the like. A pair of lead wires or conductors 23—24 are connected to the thermocouple 19 and disposed within and extending through the tubular holder 11 whereby the thermocouple may be connected to a conventional pyrometer, the working tip or head 25 of the thermocouple extending a predetermined amount beyond the semi-spherical end 15 of the holder 13. The aforesaid wires are preferably provided with heat radiation insulation such, for example, as Fiberglas to minimize radiation losses in the probe interior.

The thermocouple 19 is shielded from the full force of the onrushing air by a shield generally indicated by the reference character 26 composed of silica and comprising a cylindrical body 27 having a tapered nozzle 28 formed thereon and substantially enclosing the thermocouple. The shield is employed to direct and control the flow and minimize the heat loss of the thermocouple from the air, the temperature of which is to be measured.

Moreover, for boundary-layer tests in a hypersonic wind tunnel the aforesaid probe is small in size such, for example, as 5-mm. outside diameter with the entrance opening 1-mm. in diameter, which is desirable on order to obtain a number of data points on the nozzle wall boundary layer of the hypersonic wind tunnel. The exterior and interior surfaces of the shield 26 are coated with a suitable metallic material 29 such, for example, as platinum, the body 27 being secured to the nipple 12, preferably by cement as more clearly shown at 30 on Fig. 2. The nozzle is provided with a centrally disposed entrance opening 32 in axial alignment with the thermocouple, the body 27 being provided with a pair of diametrically disposed vent apertures 33 spaced from one end of the nipple 12 and from the semi-spherical end 15 of the thermocouple holder 13.

It will be understood that the shield is composed of silica with both the exterior and interior surfaces platinum coated to reduce conduction losses through the shield and radiation losses from the shield surface to cooler surroundings. Moreover, the pair of vent apertures 33 arranged in the shield in the aforesaid manner permit a continuous replacement and control of the rate of flow of air in the interior of the probe during operation of the device. Furthermore, by the aforesaid arrangement it will be apparent that the thermocouple support 13 and shield 26 is thermally insulated from the stainless steel holder 11 whereupon the temperature of the air moving through a wind tunnel at supersonic speeds may be accurately measured and the air within the shield is at the same temperature as the supply air.

In operation, the temperature probe is adapted to be arranged within a hypersonic wind tunnel in the path of a stream of air flowing at supersonic speeds with the shield and inlet opening therein facing up stream, the thermocouple being adapted to be connected to a conventional heat measuring apparatus by leads 23—24. By the construction and arrangement of the shield it will be understood that the air entering the shield by way of the inlet opening attains the same temperatue as the supply air and thus as such air impinges the thermocouple an accurate measurement of the temperature of the air is obtained.

From the foregoing it will be apparent that a new and improved single shielded temperature probe has been devised especially suited for use at elevated temperatures for accurately measuring the temperature of air flowing through a wind tunnel at supersonic speeds, while avoiding the usual effect of radiant heat on such measurements, minimizing conduction losses, as well as maintaining an air velocity around the sensing element appropriate for optimum temperature recovery.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A probe of the class described for sensing the boundary-layer temperature at a point within a hypersonic wind tunnel, said probe comprising an elongated tubular member, a tubular support composed of silica disposed and sealed within one end of said member, a cement sealing compound for sealing said member to said support, a hemispherical surface formed on one end of said support and extending beyond the tubular member, a thin layer of platinum covering said hemispherical surface, a thermocouple having a temperature sensing tip disposed in sealed relation within said tubular support with said tip extending beyond said surface, a cement sealing compound for sealing said thermocouple within the support, a hollow tubular shield composed of silica sealed to one end of said tubular member and having an exteriorly and interiorly tapered nozzle formed thereon terminating in a centrally disposed inlet opening in axial alignment with said thermocouple for admitting air under test into said shield, said tubular shield being covered internally and externally with a thin layer of platinum, a pair of diametrically disposed ports in said shield in proximate relation with respect to said hemispherical surface, thermocouple and inlet opening and of less cross sectional area than the cross sectional area of said inlet opening for controlling the rate of flow of said air past the thermocouple, and conductor means connected to said thermocouple for establishing an external electrical connection thereto.

2. A probe of the class described for sensing the boundary-layer temperature at a point within a hypersonic wind tunnel, said probe comprising an elongated tubular member, a tubular support composed of silica disposed and sealed within one end of said member, a hemispherical surface formed on one end of said support and extending a predetermined amount beyond the tubular member, a thin layer of platinum covering said hemispherical surface, a thermocouple arranged within said support and extending a predetermined amount beyond said surface, a sleeve composed of insulating material carried by said thermocouple and sealed within said support, a cement sealing compound for sealing said sleeve to said support, a hollow tubular shield composed of silica sealed to one end of said tubular member, said shield having an interiorly and exteriorly tapered nozzle formed thereon terminating in a centrally disposed air inlet opening in axial alignment with said sleeve for admitting air under test into said shield, a thin layer of platinum covering the interior and exterior surfaces of said tubular shield, a pair of diametrically disposed ports in said shield in proximate relation with respect to said hemispherical surface, thermocouple and said inlet opening and of less combined cross sectional area than the cross sectional area of said inlet opening for controlling the rate of flow of said air past the thermocouple, and conductor means connected to said thermocouple for establishing an external electrical connection thereto.

3. A probe for measuring the temperature of air at supersonic speeds at a point within a wind tunnel comprising an elongated tubular holder, a support composed of silica disposed and sealed within one end of said holder, said support having a centrally disposed bore extending therethrough a hemispherical surface formed on said support and extending beyond said tubular holder, a thin layer of platinum covering said hemispherical surface, a thermocouple sealed with said bore and extending beyond said surface, a cement for sealing said thermocouple within the bore, a hollow shield composed of silica sealed to said tubular holder, a nozzle tapered both exteriorly and interiorly formed on said shield and having a centrally disposed inlet opening therein in axial alignment with said thermocouple whereby air entering said opening impinges the thermocouple, a thin layer of platinum covering the outside and inside surfaces of said shield, a pair of diametrically disposed ports in said shield in proximate relation with respect to said hemispherical surface, thermocouple and said inlet opening for controlling the rate of flow of said air past the thermocouple, said diametrically disposed ports having a total cross sectional area not greater than one fourth of the cross sectional area of said inlet opening, and conductor means connected to said thermocouple for establishing an external electrical connection thereto.

4. A probe according to claim 1 in which said conductor means comprises a pair of Fiberglas sleeved wires disposed within said tubular support.

5. A probe according to claim 1 in which said tubular support does not exceed 5 mm. in diameter and the diameter of said inlet opening is 1 mm.

6. A probe according to claim 5 in which the combined cross sectional areas of the ports is one-fifth the cross sectional area of said inlet opening.

References Cited in the file of this patent

UNITED STATES PATENTS

| | | |
|---|---|---|
| 1,615,451 | Harrison | Jan. 25, 1927 |
| 2,496,835 | Ward | Feb. 7, 1950 |
| 2,516,952 | Bristol | Aug. 1, 1950 |
| 2,609,406 | Barsy | Sept. 2, 1952 |
| 2,642,468 | Dodson | June 16, 1953 |
| 2,653,983 | Best | Sept. 29, 1953 |

FOREIGN PATENTS

| | | |
|---|---|---|
| 461,370 | Great Britain | Feb. 16, 1937 |